United States Patent
Maurer et al.

(10) Patent No.: US 10,677,611 B2
(45) Date of Patent: Jun. 9, 2020

(54) CIRCULAR SYSTEM AND METHOD FOR THE DIGITAL CORRECTION OF MODULATION EFFECTS IN ELETROMECHANICAL DELTA-SIGMA MODULATORS

(71) Applicant: Albert-Ludwigs-Universitat Freiburg, Freiburg (DE)

(72) Inventors: Michael Maurer, Rheinhausen (DE); Yiannos Manoli, Freiburg (DE)

(73) Assignee: Albert-Ludwigs-Universitat Freiburg, Freiburg (DE)

(*) Notice: Subject to any disclaimer, the term of this patent is extended or adjusted under 35 U.S.C. 154(b) by 71 days.

(21) Appl. No.: 15/287,321

(22) Filed: Oct. 6, 2016

(65) Prior Publication Data

US 2017/0102248 A1    Apr. 13, 2017

(30) Foreign Application Priority Data

Oct. 8, 2015  (DE) .................. 10 2015 219 458

(51) Int. Cl.
*B41J 3/00*     (2006.01)
*G01C 25/00*    (2006.01)
(Continued)

(52) U.S. Cl.
CPC ....... *G01C 25/005* (2013.01); *G01C 19/5712* (2013.01); *G01C 19/5726* (2013.01); *G01C 19/5776* (2013.01)

(58) Field of Classification Search
USPC .................................................... 73/504.16
See application file for complete search history.

(56) References Cited

U.S. PATENT DOCUMENTS 5,440,269 A    8/1995  Hwang
7,825,840 B2   11/2010 Willig et al.
(Continued)

FOREIGN PATENT DOCUMENTS

DE   10 2005 046 699 A1    4/2007
DE      102011005745 A1    9/2011
DE   10 2011 055 745 A1    5/2013

OTHER PUBLICATIONS

Abstract of DE 10 2011 005 745, dated May 29, 2013, 1 page.
(Continued)

*Primary Examiner* — Lam S Nguyen
(74) *Attorney, Agent, or Firm* — Barley Snyder

(57) ABSTRACT

The present invention relates to a circuit arrangement and a method for reading a capacitive vibratory gyroscope with an at least primary mass and at least one secondary mass that is connected to the primary mass, wherein the primary mass is excited to a primary vibration during operation, and wherein the secondary mass is deflected out of a resting position in a direction that is transversal to the primary vibration when the vibratory gyroscope rotates around a sensitive axis. The circuit arrangement comprises a delta-sigma modulator with at least one control loop to perform a force feedback that resets the secondary mass into its resting state by applying a reset signal, wherein the reset signal forms a modulator output signal of the delta-sigma modulator, a correction unit that receives the modulator output signal and that is operated to generate a corrected modulator output signal that corresponds to an actually acting feedback force, a demodulator that is connected to the correction unit for demodulation of the corrected modulator output signal, and a filter arrangement to filter the demodulated signals and to output a rotary rate signal.

10 Claims, 16 Drawing Sheets

Figure 1:
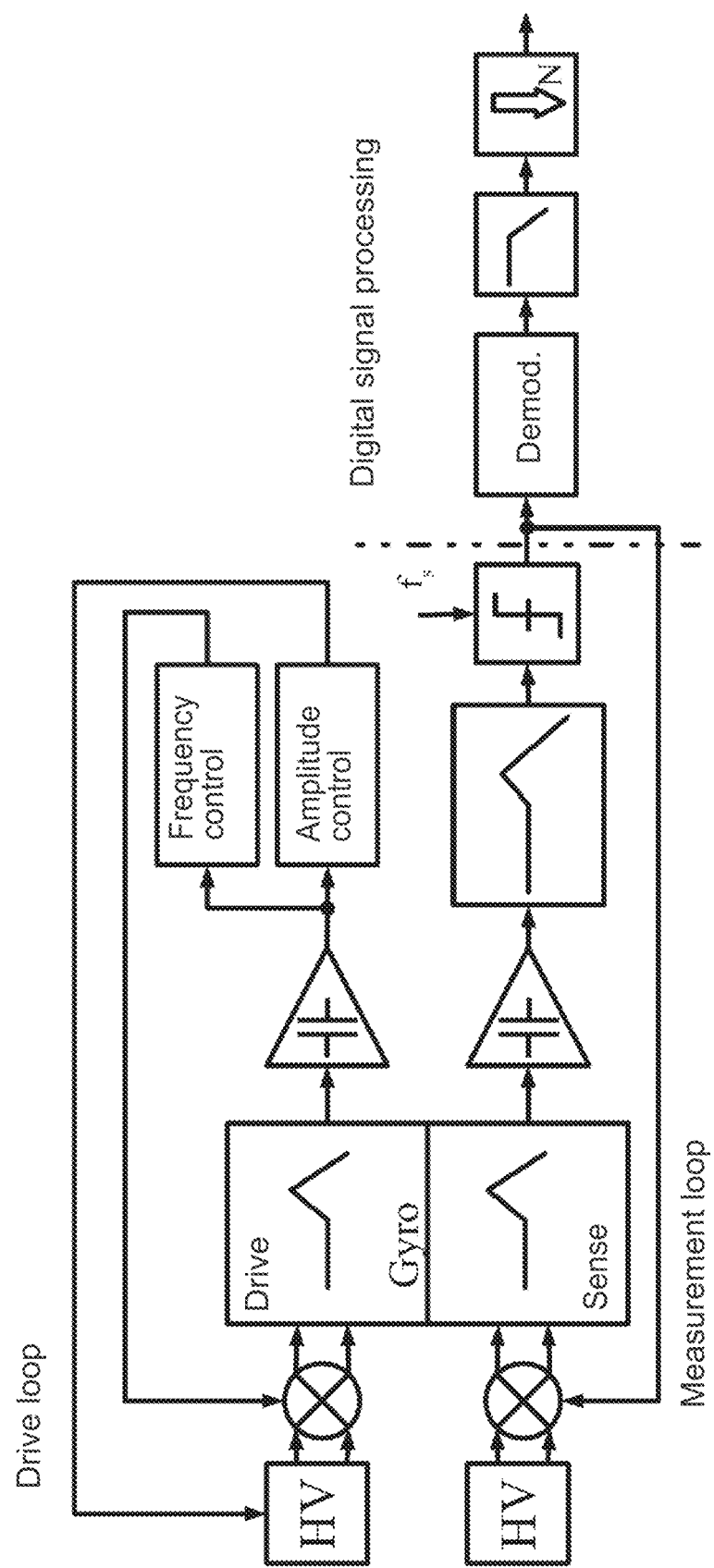

(51) Int. Cl.
  *G01C 19/5726* (2012.01)
  *G01C 19/5712* (2012.01)
  *G01C 19/5776* (2012.01)

(56) References Cited

U.S. PATENT DOCUMENTS

| | | | | |
|---|---|---|---|---|
| 7,891,245 | B2* | 2/2011 | Murakami | G01P 15/097 |
| | | | | 73/504.12 |
| 8,857,259 | B2 | 10/2014 | Hsu | |
| 9,535,084 | B2* | 1/2017 | Egretzberger | G01C 19/56 |
| 9,696,338 | B2* | 7/2017 | Kishiro | G01L 9/12 |
| 2009/0066550 | A1 | 3/2009 | Hammerschmidt | |
| 2014/0060185 | A1 | 3/2014 | Rombach et al. | |
| 2016/0202061 | A1 | 7/2016 | Maurer et al. | |

OTHER PUBLICATIONS

Abstract of DE 10 2005 046 699, dated Apr. 5, 2007, 1 page.

Search Report, dated Jul. 14, 2016, 12 pages.

European Search Report, dated Jan. 25, 2017, 9 pages.

T. Northemann, M. Maurer, S. Rombach, A. Buhmann, Y. Manoli: "Drive and sense interface for gyroscopes based on bandpass sigma-delta modulators", Proc. IEEE Int. Circuits and Systems (ISCAS) Symp, pp. 3264-3267, 2010, 4 pages.

Yufeng Dong, Michael Kraft, William Redman-White; "Force feedback linearization for higher-order electromechanical sigma-delta modulators", Journal of Micromechanics and Microengineering, 16 (6): p. 54, 2006.

C. D. Ezekwe, B. E Boser, "A Mode-Matching Closed-Loop Vibratory-Gyroscope Readout Interface with a 0.0004°/s/√Hz Noise Floor over a 50Hz Band", Proc. Digest of Technical Papers. IEEE International Solid-State Circuits Conference ISSCC 2008, p. 58 ff.

R. Schreier, G. Temes, "Understanding Delta-Sigma Data Converters", Wiley, New York, 2005, p. 200.

M. Sarhang-Nejad, G.C. Temes, "A high-resolution multibit $\Sigma\Delta$ ADC with digital correction and relaxed amplifier requirements", IEEE J. Solid-State Circuits, 28(6): 648-660, 1993.

\* cited by examiner

CIRCULAR SYSTEM AND METHOD FOR THE DIGITAL CORRECTION OF MODULATION EFFECTS IN ELETROMECHANICAL DELTA-SIGMA MODULATORS

The present invention relates to a circuit arrangement for reading out a capacitive vibratory gyroscope with at least one primary mass and at least one secondary mass that is connected to the primary mass, wherein the primary mass is excited during the operation to become a primary vibration and wherein the secondary mass is deflected out of a resting position in a direction that is transversal to the primary vibration when the vibratory gyroscope rotates around a sensitive axis. Further, the present invention relates to a pertaining method for operating and reading out such a capacitive vibratory gyroscope.

The present invention relates to sensors and in particular to inertial sensors for measuring a rotary rate, i.e. an angular speed due to a Coriolis acceleration.

Micromechanical Coriolis vibratory gyroscopes (CVG) have a movable mechanical structure that is excited to perform a periodical movement. This periodical vibration that is generated through excitation is also referred to as primary vibration. If the sensor is rotated around an axis in a perpendicular direction to the primary vibration or primary movement, the movement of the primary vibration will lead to a Coriolis force that is proportional to the measured variable, i.e. the angular speed. This axis is referred to as the sensitive axis of the sensor. A second vibration that is orthogonal to the primary vibration is excited through the Coriolis force. This second vibration that is orthogonal to the primary vibration is also called secondary vibration or secondary movement. The secondary vibration that is also called detection vibration can also be recorded by means of different measurement methods, wherein the recorded variable is used as a benchmark for the rotary rate that acts onto the vibratory gyroscope. To generate the primary vibration, thermal, piezoelectric and inductive methods that are known in technology are used inter alia. Piezoelectric, piezoresistive or capacitive principles are the state of the art to record the secondary vibration.

Vibratory gyroscopes can be formed in different ways. However, all vibratory gyroscopes have the common feature that they comprise a vibrating device that can be displaced in the primary direction by means of a primary excitation device and that they have a secondary recording device that can measure a secondary movement due to a rotary rate that acts onto the vibratory gyroscope. In undecoupled sensors, the same vibrating mass performs both the primary as well as the secondary movement. In that case, the vibrating device is designed in a way as to comprise a mass that is suspended movably both in the x-direction as well as in the y-direction. It is assumed without restricting the generality that the x-direction is the direction of the primary movement or the primary vibration and that the y-direction is the direction of the secondary movement and/or the secondary vibration and that the rotary rate acts on the vibration device in the z-direction.

The vibration device is usually divided into a primary oscillator and a secondary oscillator. The primary oscillator performs a vibration in the primary direction and is coupled to the secondary oscillator in a way that the primary vibration is transferred to the secondary oscillator. The primary oscillator is ideally suspended on a substrate in a way that it can only move in the primary direction but not in the secondary direction. Therefore, a Coriolis force that acts on the primary oscillator does not lead, due to a rotary rate, to the primary oscillator being deflected in the secondary direction as this degree of freedom of movement does not exist for the primary oscillator due to its suspension. In contrast, the secondary oscillator is suspended in such a way that it can move both in the primary direction as well as in the secondary direction. The secondary movement leads to the secondary oscillator being able to move in the secondary direction, wherein this secondary movement can be recorded by the secondary recording device. Preferably, the secondary recording device is thereby formed in a way that it does not record the primary movement which the secondary oscillator records only to be sensitive on the Coriolis force. Moreover, and in order to achieve an even better coupling, the connection between the primary oscillator and the secondary oscillator is formed in a way that although the primary vibration is transferred from the primary oscillator to the secondary oscillator, the secondary vibration will not be transferred back to the primary oscillator.

Vibratory gyroscopes are used for example in driver assistance systems, for electronic stability control (ESC) and for navigation systems. These sensors thereby detect rotary rates around a defined sensitive axis based on the Coriolis effect. As explained above, the vibratory gyroscope consists of two masses, i.e. the primary and as well as the secondary mass. To be able to detect a rotary rate by means of the Coriolis effect, the entire mass has to be set in motion. The primary mass, in which the secondary mass is suspended, is set in a constant vibration. Through a rotation of the sensor around the sensitive axis, the secondary mass is deflected orthogonally to the primary axis according to the following equation (1).

$$\vec{F}_c = -2m\vec{\Omega} \times \vec{v}_p \qquad (1)$$

Here, $F_c$ is the Coriolis force, m the mass, $\Omega$ the rotary rate and $v_p$ the speed of the primary mass, The secondary mass is thereby ideally suspended mechanically so that it can only deflect orthogonally to the primary oscillation. A large amplitude of the primary vibration is desirable in order to achieve a high sensitivity. The primary mass is hereby usually excited resonantly and the amplitude of the oscillation is regulated by means of an automated gain control (AGC) as is known from the article T. Northemann, M. Maurer, S. Rombach, A. Buhmann, Y. Manoli: "Drive and sense interface for gyroscopes based on bandpass sigma-delta modulators", Proc. IEEE Int. Circuits and Systems (ISCAS) Symp, pages 3264-3267, 2010.

When using the vibratory gyroscope in an electromechanical delta-sigma control loop, the feedback signal is used to reset the deflection of the secondary mass and hence as a direct benchmark for the forces that act on the secondary mass, as is shown for example in the German patent specification DE 10 2005 046 699 B4. FIG. 1 shows a simplified block circuit diagram consisting of a sensor, a control loop of the primary mass, an electromechanical delta-sigma modulator (hereinafter also abbreviated as em$\Delta\Sigma$M) as well as the digital signal processing that consists of demodulation and filtering. The advantages of using a delta-sigma control loop are in this case the output signal that is availably digitally in form of a bit stream as well as the simple implementability of the feedback due to the single-bit structure.

Figure 2:
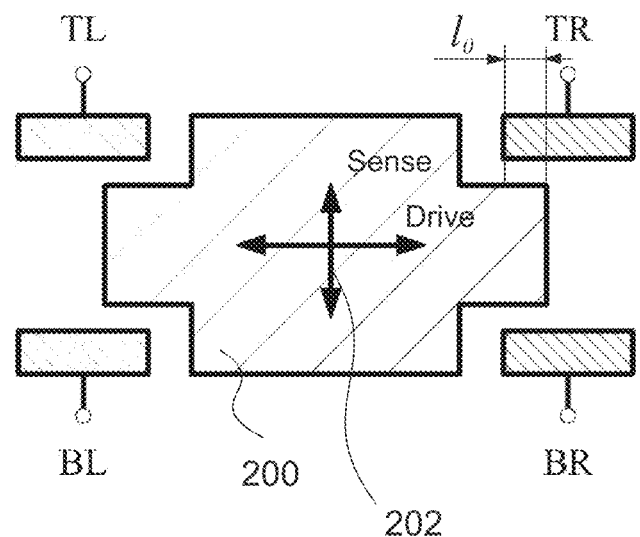

FIG. 2 shows a possible arrangement of the feedback electrodes on the secondary mass 200 of a vibratory gyroscope in an exemplary way. Fixed electrodes TL (at the top left), TR (at the top right), BL (at the bottom left) and BR (at the bottom right) enable a capacitive detection of the deflection of the secondary mass 200 in the measurement direction. The overlapping length of the electrodes with the secondary mass in the resting state is denominated with $l_0$.

To achieve a force effect that is as independent of the primary vibration as possible, the electrodes are usually formed in a mechanically equal way so that for example the following equations (2) and (3) apply for the capacitances due to the primary vibration $x_p$:

$$C_{TL} = C_{BL} = C_0 \frac{l_0 + x_p}{l_0} \quad (2)$$

(3)

In this context, $x_p$ denominates the momentary deflection through the primary vibration, $C_o$ the output capacitance in the resting state and $l_0$ the overlapping length of the electrodes and the secondary mass in the resting state.

To generate a feedback force for the Coriolis force that is formed according to equation (1), voltages are applied to the electrodes in a way that an electrostatic counterforce is generated along the direction 202 of the recording movement.

The electrostatic force $F_{el}$ on an individual electrode in the recording direction 202 results, according to the generally known physical principles, from the capacitive energy content $E_c$ in relation to:

$$F_{el} = \frac{d}{dx_s} E_C$$

$$F_{el} = \frac{d}{dx_s} \frac{1}{2} \cdot CU^2$$

$$F_{el} = \frac{d}{dx_s} \frac{1}{2} \cdot C \cdot \frac{d_0}{d_0 - x_s} U^2$$

$$F_{el} = \frac{1}{2} \cdot C \cdot \frac{d_0}{(d_0 - x_s)^2} U^2$$

$$F_{el} \approx \frac{C \cdot U^2}{2 \cdot d_0}$$

In this context, the momentary deflection $x_s$ of the secondary mass in the recording direction can be neglected here due to the deflections that are typical in systems with a closed control loop and that are very small compared to the electrode distance $d_o$.

Through the different force directions on the individual electrodes, a feedback force can be achieved for example by means of applying the electrode voltages $U_{TL}U_{TR}=U_{DC}+U_{FB}$ and $U_{BL}=U_{BR}=U_{DC}-U_{FB}$. The feedback force will then be the result based on the force effect on the individual electrodes in relation to:

$$F_{ges} = F_{TL} + F_{TR} - F_{BL} - F_{BR}$$

$$= \frac{1}{2 \cdot d_0} [C_{TL} \cdot (U_{DC} + U_{FB})^2 + C_{TR} \cdot (U_{DC} + U_{FB})^2 \ldots$$

$$\ldots - C_{BL} \cdot (U_{DC} - U_{FB})^2 - C_{BR} \cdot (U_{DC} - U_{FB})^2]$$

$$= \frac{2}{d_0} \cdot C_{TL} \cdot U_{DC} \cdot U_{FB} + 2 \cdot C_{TR} \cdot U_{DC} \cdot U_{FB}$$

$$= \frac{2}{d_0} \cdot C_0 \cdot U_{DC} \cdot U_{FB} \cdot \left(\frac{l_0 + x_p}{l_0} + \frac{l_0 - x_p}{l_0}\right)$$

$$= \frac{2}{d_0} \cdot C_0 \cdot U_{DC} \cdot U_{FB} \cdot \frac{l_0 + x_p + l_0 - x_p}{l_0}$$

$$= \frac{4}{d_0} \cdot C_0 \cdot U_{DC} \cdot U_{FB}$$

The required feedback voltage $U_{FB}$ can therefore be used directly as a benchmark for the emerging Coriolis forces.

Production inaccuracies can lead, for example due to fluctuations of the layer thickness, to the relations (2) and (3) not being fulfilled exactly, If a capacitive deviation factor $a$ is defined around which the capacitances on the left side in FIG. 2 are higher and the capacitances on the right side are lower than the ideal nominal value $C_0$, the capacitances are given by the following equations (4) and (5)—similarly to the equations (2) and (3)—as a function of the momentary position $x_p$ of the primary vibrations:

$$C_{TL} = C_{BL} = (1 + \alpha) \cdot C_0 \frac{l_0 + x_p}{l_0} \quad (4)$$

$$C_{TR} = C_{BR} = (1 - \alpha) \cdot C_0 \frac{l_0 - x_p}{l_0} \quad (5)$$

The resulting force $F_{ges,dr}$, that acts on the secondary mass as a consequence of the applied feedback voltage, can be calculated on this basis as follows:

$$F_{ges,dr} = \frac{4}{d_0} \cdot C_0 \cdot U_{DC} \cdot U_{FB} + \alpha \cdot dF \quad (6)$$

$$dF = \frac{2}{d_0} \cdot C_0 \cdot U_{DC} \cdot U_{FB} \cdot \left(\frac{l_0 + x_p}{l_0} - \frac{l_0 - x_p}{l_0}\right)$$

$$= \frac{2}{d_0} \cdot C_0 \cdot U_{DC} \cdot U_{FB} \cdot \frac{l_0 + x_p - l_0 + x_p}{l_0}$$

$$= \frac{4}{d_0} \cdot C_0 \cdot U_{DC} \cdot U_{FB} \frac{x_p}{l_0}$$

$$F_{ges,dr} = \frac{4}{d_0} \cdot C_0 \cdot U_{DC} \cdot U_{FB} \cdot \left(1 + \alpha \cdot \frac{x_p}{l_0}\right) = F_{ges} \cdot \left(1 + \alpha \cdot \frac{x_p}{l_0}\right)$$

Hence, the actually applied reset forces can depend on the primary vibration due to the required sine oscillation of the primary mass. Comparable effects can also occur due to other production variations or inaccuracies in the sensor movement.

Figure 3:
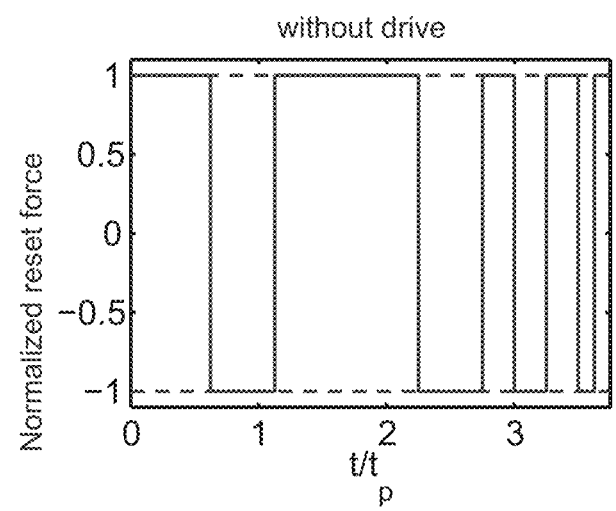

Ideally, the amount of the reset forces would be constant and the plus/minus sign of the impacting force would only depend on the bit stream of the delta-sigma modulator as can be seen in FIG. 3. Due to the primary vibration, this force is overlaid by a sine term that is though dependent on the amplitude and frequency of the primary vibration according to equation (6). This can be taken from FIG. 4 in which the force effect is shown in an overdrawn display and not drawn to scale for a nominal primary vibration.

Figure 5:
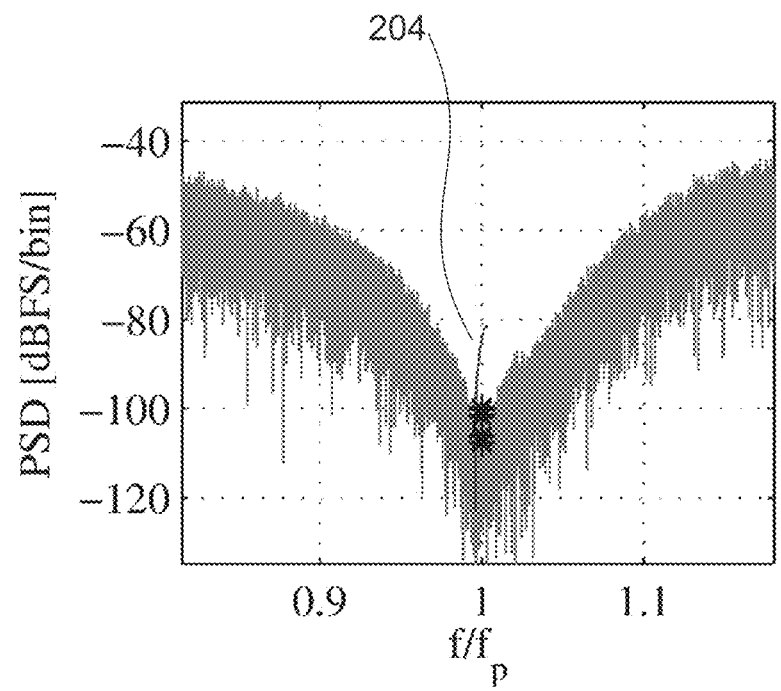
Figure 6:
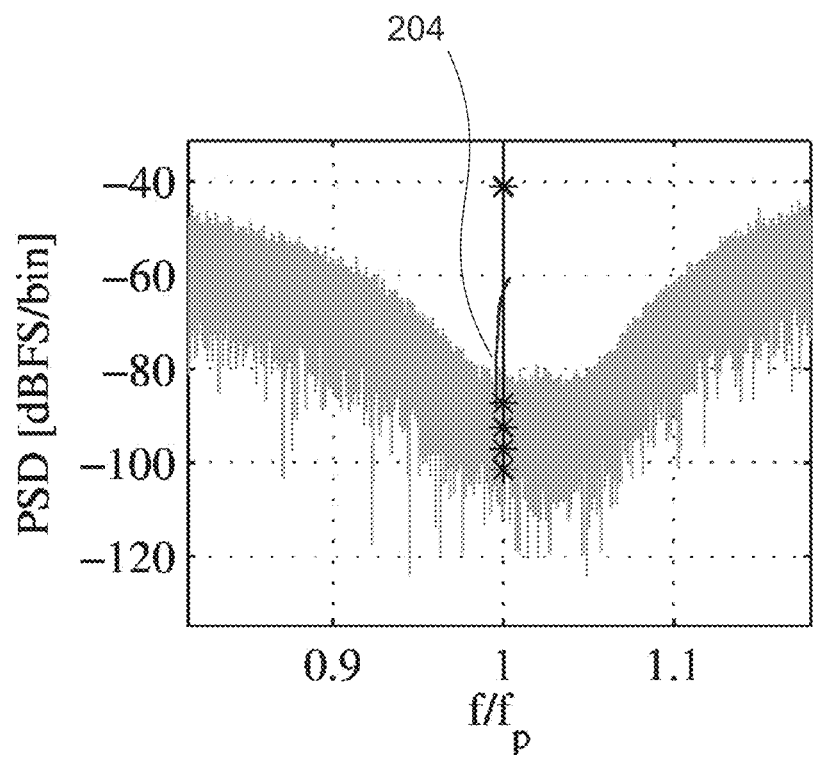

Due to noise convolution effects, this overlaid vibration leads to a significant increase of the noise in the signal band ("inband noise", IBN) of the delta-sigma modulators compared to an operation with a switched-off primary vibration. FIGS. 5 and 6 respectively show the corresponding spectrum (power spectrum density. PSD) of the delta-sigma bit stream in case of a switched-off and/or a nominal primary vibration. In this context, the curves 204 illustrate respectively the noise in the signal band.

This is caused by the condition that, due to the overlaid vibration, the high quantization noise of the delta-sigma modulator at is folded into the signal band at DC and/or $2 \cdot f_p$ (with $f_p$ being the frequency of the primary vibration).

Figure 7:
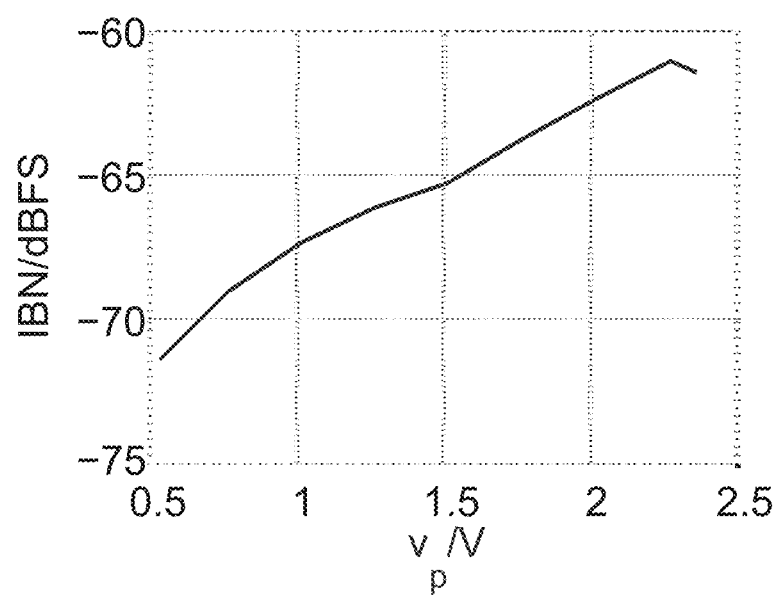

FIG. 7 shows the measured noise in the signal band as a function of the primary amplitude. Here, a direct correlation between the primary amplitude ($v_p$) measured at the output of the load integrator and the noise in the signal band of the em$\Delta\Sigma$M. For higher primary amplitudes, there will be—as can be expected according to equation (6)—a stronger noise convolution effect due to the feedback forces that are not constant, which leads to a growing noise in the signal band.

An effect that is similar to this problem is described in the article Yufeng Dong, Michael Kraft, William Redman-White: "Force feedback linearization for higher-order electromechanical sigma-delta modulators". Journal of Micromechanics and Microengineering, 16(6): p54, 2006. In a reading circuit for an acceleration sensor, the variables of the feedback capacitances change due to the remaining movement of the sensor mass. Here, the remaining movement of the sensor mass is proportional to the present acceleration.

If constant feedback voltage levels are used, it will lead to higher harmonics of the signal becoming visible in the spectrum.

Figure 8:
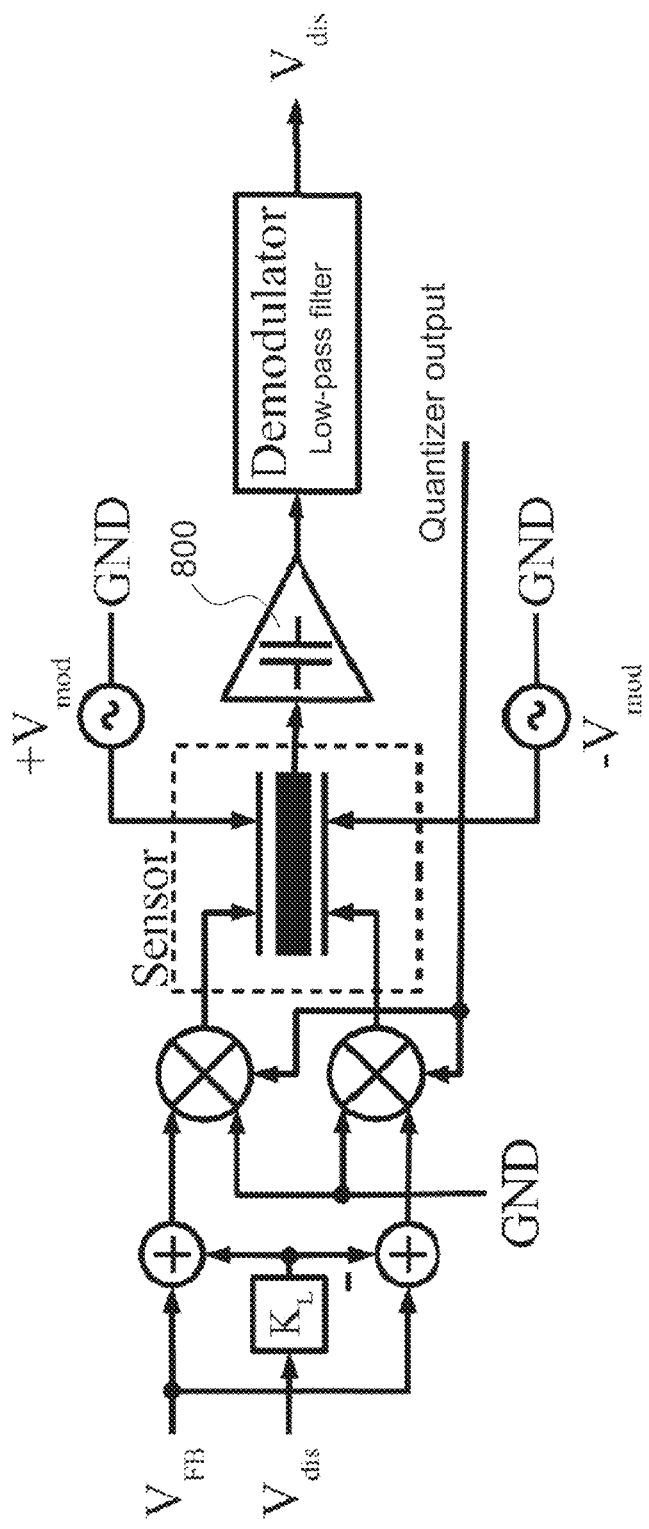

To eliminate this effect, according to the abovementioned publication Yufeng Dong, Michael Kraft, William Redman-White: "Force feedback linearization for higher-order electromechanical sigma-delta modulators". Journal of Micromechanics and Microengineering, 16(6): p54, 2006, a linearization of the feedback forces is performed. In this respect and as shown in FIG. 8, the current position of the sensor mass $V_{dis}$ is determined using a pick-off circuit, the C/V converter 800 and an analogous low-pass filtering system. The linearly scaled deflection $V_{dis} \cdot K_L$ will then be used to readjust the applied feedback voltages.

Through this correction, nearly constant feedback forces can be achieved in case of correct balancing for $K_L$, which leads to inhibition of the higher harmonics and hence to linearization of the system.

An adaption of this known method for the reduction of the dependence of the applied feedback forces on the primary vibration would be possible although it would mean a work-intensive analogous creation of the high feedback voltages. In addition, a balancing possibility in the analogous range would be required for each partial problem in order to achieve a constant feedback force.

Hence, also an increased power and surface consumption as well as a more work-intensive calibration of the overall system can be expected besides a higher complexity of the analogous circuit parts.

Figure 9:
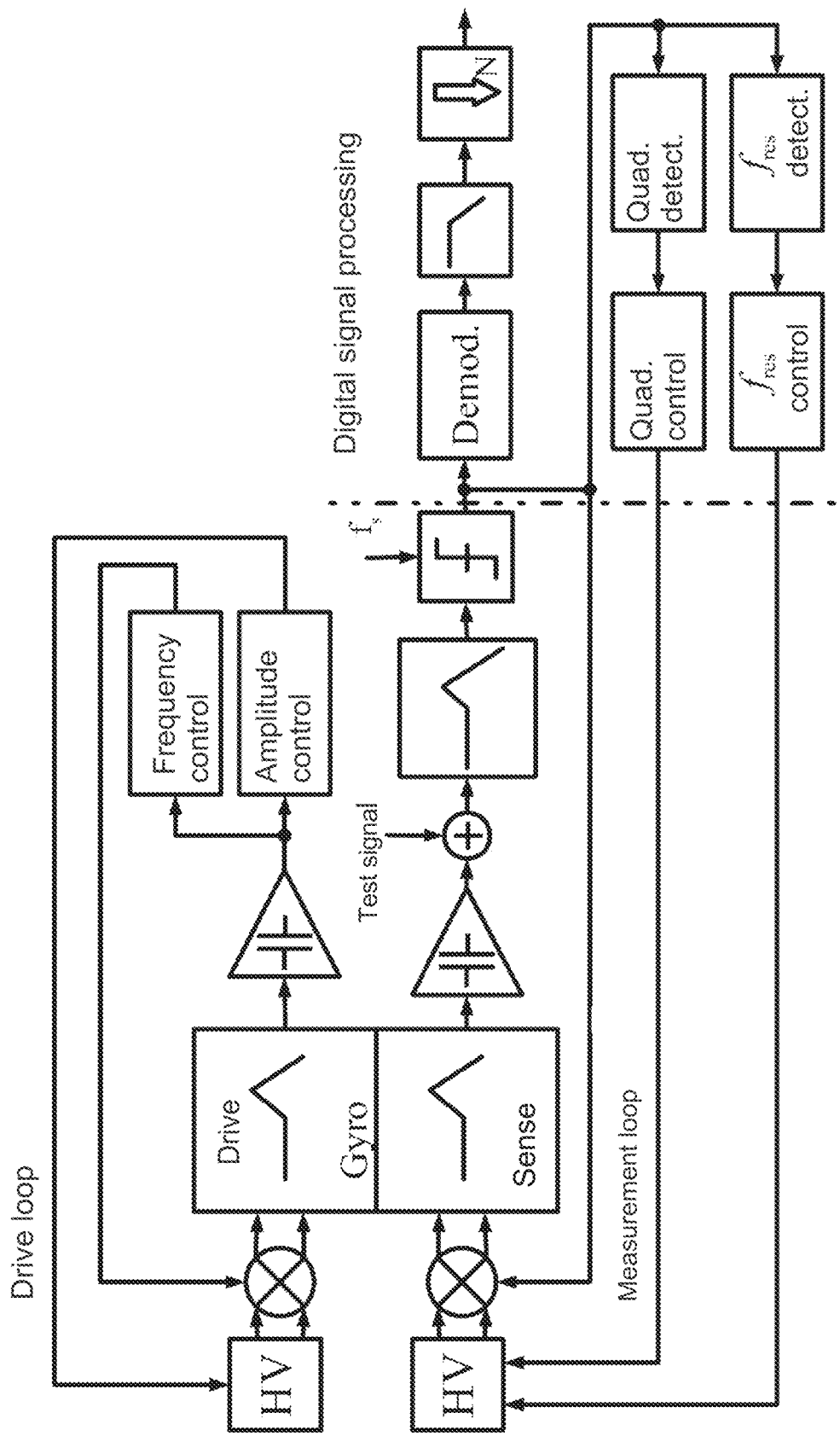

Furthermore, it is known to read out vibratory gyroscopes in the so-called mixed-matched mode to improve the system parameters, This means that the resonance frequencies of the primary and secondary oscillator are adjusted in relation to one another. For this purpose, the so-called spring-softening effect is usually used to shift the resonance frequency of the secondary side. An example for such a reading interface is shown in C. D. Ezekwe, B. E. Boser "A Mode-Matching Closed-Loop Vibratory-Gyroscope Readout Interface with a 0.004°/s/√Hz Noise Floor over a 50 Hz Band", Proc. Digest of Technical Papers. IEEE International Solid-State Circuits Conference ISSCC 2008, p. 58 ff. To build a control loop, test signals are typically fed in to be able to detect the current situation of the secondary resonance frequency. To adjust the quadrature error of the sensor, an automated control is also often used. A block circuit diagram with these control functions is shown in FIG. 9. As displayed in this figure, the arrangement of FIG. 1 is extended by the circuit units for the quadrature control and the control of the secondary resonance frequency $f_{res}$ in case of the mixed-matched mode reading method.

A corresponding adjustment option for the resonance frequency and the quadrature compensation is ensured via the feedback electrodes of the secondary oscillator as is displayed in FIG. 2. Therefore, the voltages at the capacitances are extended by a quadrature term ($U_{Quad}$) and a frequency term ($U_{Mode}$). The following applies:

$$U_{TL} = U_{Mode} + U_{Quad} + U_{FB} \qquad (7)$$

$$U_{TR} = U_{Mode} - U_{Quad} + U_{FB} \qquad (8)$$

$$U_{BL} = U_{Mode} - U_{Quad} - U_{FB} \qquad (9)$$

$$U_{BR} = U_{Mode} + U_{Quad} - U_{FB} \qquad (10)$$

On this basis, the following proportionalities apply for the resulting forces:

$$F_{FB} \propto U_{Mode} \cdot U_{FB} \qquad (11)$$

$$F_{Quad} \propto U_{Mode} \cdot U_{Quad} \qquad (12)$$

$$F_{mode} \propto U_{Mode}^2 + U_{Quad}^2 + U_{FB}^2 \qquad (13)$$

However, it is problematic that the control voltage of the frequency control also has an influence on the reset forces. For major changes of $U_{Mode}$, which might become necessary for example over a large temperature range, this leads to a modification of the scale factor of the sensor system.

As the frequency control only has to balance very slow modifications, $U_{Mode}$ typically contains especially spectral components with low frequencies. This is displayed in FIG. 10 in form of an exemplary spectrum of the control signal for the frequency control ($U_{Mode}$).

Figure 11:
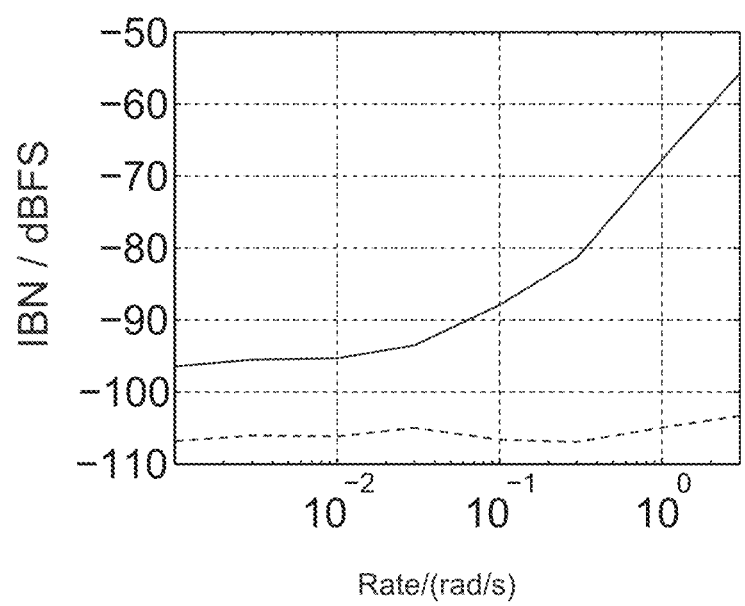
Figure 12:
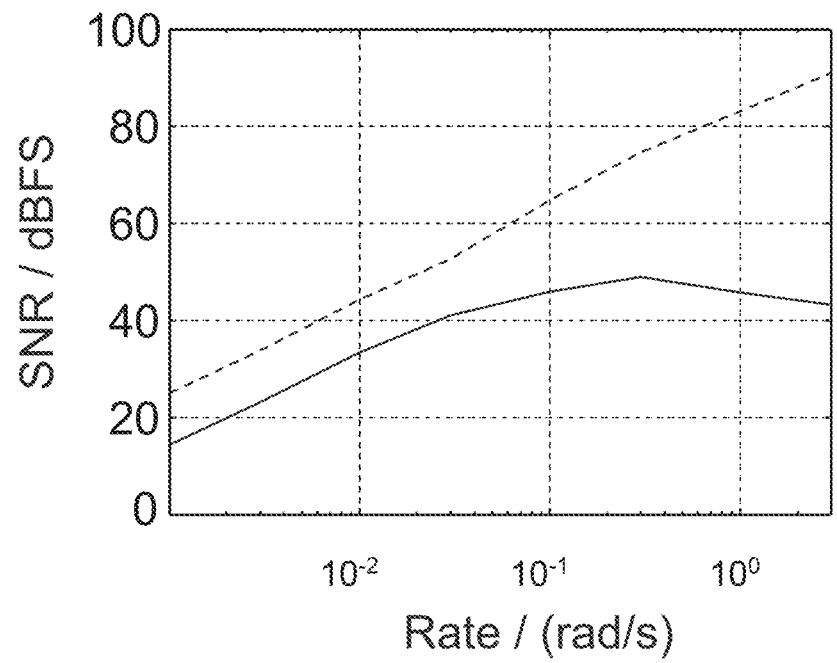

A convolution of the quantization noise into the signal process takes place to a limited extent. This can for example be influenced favorably by the choice of the control parameters. However, FIGS. 11 and 12 show that, in case of higher signal amplitudes, a strong increase of the noise in the signal band takes place compared to a calibrated but uncontrolled system, which manifests itself also as a limitation in the signal to noise ratio (SNR), This is also caused by a modulation of the control spectrum with the signal components in the em$\Delta\Sigma$M spectrum. FIG. 11 in particular shows the IBN and FIG. 12 shows the signal to noise ratio of the calibrated (dashed curve) and the controlled (solid curve) bit stream of the delta-sigma modulator for different rotary rates.

Figure 13:
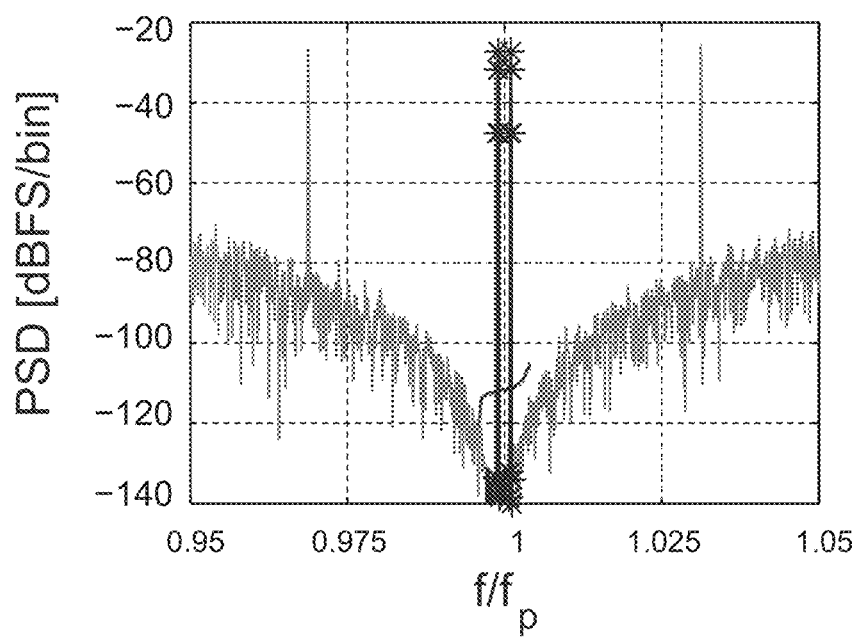
Figure 14:
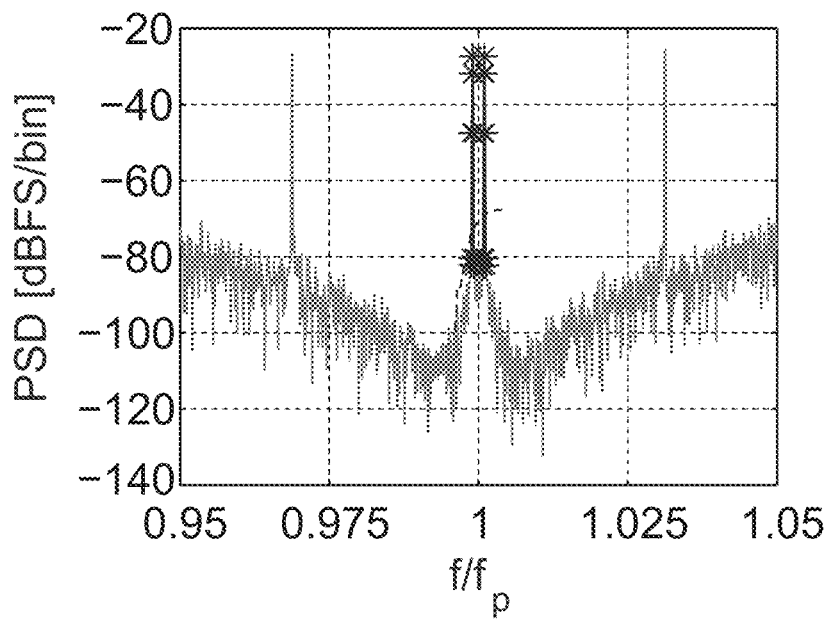

FIG. 13 shows, in an exemplary way for a high applied rotary rate, the filling process of the signal band compared to the spectrum of a calibrated, uncontrolled system as displayed in FIG. 14. In this context, FIG. 13 shows the spectrum of the bit stream of the delta-sigma modulators for a switched-off frequency control and FIG. 14 shows the spectrum of the bit stream of the delta-sigma modulator for a switched-on frequency control.

Figure 15:
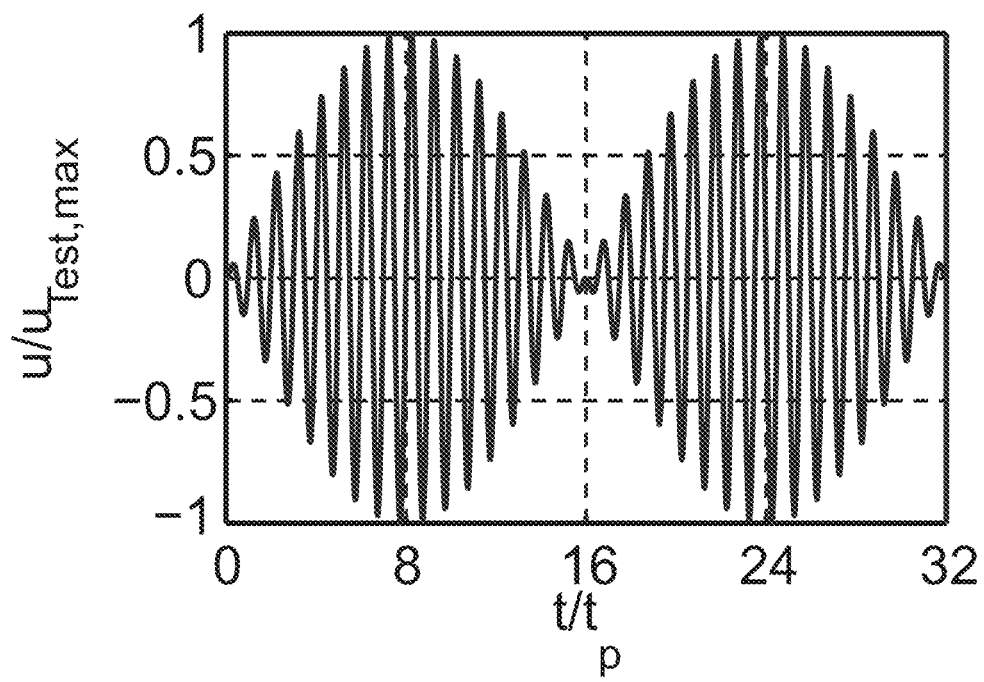

To be able to achieve a detection of the resonance frequency, test signals are usually fed into the system. Here, a signal can be used whose spectral components are, as shown in FIG. 15, arranged symmetrically around the signal band. The use of such signals is described in the article C. D. Ezekwe, B. E. Boser: "A Mode-Matching Closed-Loop Vibratory-Gyroscope Readout Interface with a 0.004°/s/√Hz Noise Floor over a 50 Hz Band", Proc. Digest of Technical Papers. IEEE International Solid-State Circuits Conference ISSCC 2008, p. 58 ff, and in the disclosure publication DE 10 2011 005 745 A1. The basic frequency thereby corresponds to the resonance frequency of the primary mass, the frequency of the enclosing ends corresponds to the ratio of the test signals to this frequency and therefore determines the ratio to the signal band.

The DE 10 2011 005 745 A1 shows a possibility of eliminating this problem. Here, the idea that the four voltages on the sensor are set in a way that the forces that emerge respectively for feedback, quadrature control and frequency control on the sensor are each linearly dependent on only one digital value (FB, Quad, Mode) and that no cross-sensitivities occur with respect to the other values, is used as the fundamental principle.

This is achieved by taking into account the quadratic relationship between the applied voltage and the generated force at a capacitance for the calculation of the voltages to be used in FIG. 9. To counteract this quadratic relationship, it is necessary to apply a root function for the transition from the digital control value to the generated voltage. The four sensor voltages are therefore generated on the basis of the following relationships:

$$U_{TL} = \sqrt{Mode + Quad + FB} \qquad (14)$$

$$U_{TR} = \sqrt{Mode + Quad - FB} \qquad (15)$$

$$U_{BL} = \sqrt{Mode - Quad + FB} \qquad (16)$$

$$U_{BR} = \sqrt{Mode - Quad - FB} \qquad (17)$$

With the applied root function, it is possible to ensure that the generated reset forces for the rotary rate will be independent of the frequency and the quadrature control.

The described method is aligned to the problem of the matched-mode operation. An additional consideration of influences due to the primary vibration should be possible by means of correcting the digital value for the feedback forces (FB) in order to compensate the effect formulated in equation (6).

However, a problematic aspect of this solution is on one hand that the digitally calculated values for the voltages on the sensor have to be generated as accurately as possible. Misadjustments of the voltages, in turn, will lead to interdependencies between the different control variables.

However, the main problem consists in that a new calculation due to updated controller values can entail a strong change of the feedback force that is actually applied to the sensor. This would be caused for example due to an adaptation of the voltages being required for only one part of the used digital-analog converters (DAC) because of the limited number of (DAC) levels while others keep their initial voltage constant. Hence, there is the risk of an additional rounding noise being fed into the feedback path in case of each new calculation of the values. To minimize this effect, high-resolution DACs are therefore required.

Due to the required root calculations as well as the necessary high-resolution DACs, also a high power and area consumption is to be expected for this solution.

The purpose of the present invention is to indicate a circuit arrangement and a method for the correction of noise-convolution effects in order to reduce the noise in the signal band, wherein the sensor arrangement can at the same time be manufactured cost-efficiently and while being reliable and space-efficient.

This problem is solved by the object of the independent patent claim. Advantageous further developments of the present invention are the object of the sub-claims.

The present invention is based on the idea that feedback force, which is not constant in terms of its amount due to the primary vibration and the mode-matching control voltage, is digitally reproduced in order to minimize the interference effects described above.

Typically, it is assumed for the single-bit $\Delta\Sigma M$ used in the vibratory gyroscopes that the feedback enables a perfectly linear operation due to the use of only two levels to generate the feedback forces. In addition, the reset value is usually regarded as temporally constant or it is attempted, as illustrated above, to keep the reset as constant as possible. In contrast to this, it is known for multi-bit $\Delta\Sigma M$ that the DAC used for the generation of the reset can present non-linearities. As a possible corrective measure, the monography R. Schreier, G. Temes: "Understanding Delta-Sigma Data Converters", Wiley, New York, 2005, p. 200 shows a possibility in which for each input code of the DAC, the actually emitted values can be measured and saved as part of a calibration.

The saved measurement values can be used during operation of the $\Delta\Sigma M$ in order to be able to depict the respectively emitted DAC output value in the digital part of the system more accurately.

On the basis of this digital correction, the feedback force, which is not constant in value due to the primary vibration and the mode-matching control voltages, can be digitally reproduced to minimize the abovementioned interference effects.

In contrast to the solution known from R. Schreier, G. Temes: "Understanding Delta-Sigma Data Converters", Wiley, New York, 2005, it is though not purposeful for multi-bit $\Delta\Sigma M$ to assign a constant corrective value to each of the input codes of the (single-bit) DAC. Therefore, according to the invention, a new correction value is calculated for each sample value, which corresponds to the mean force effect during this sample value, based on the situation that exists in this moment for the primary amplitude and the mode-matching control signal. Then, not the value 1 and/or −1 that is usual for the single-bit $\Delta\Sigma M$ will be assigned to each sample value of the bit stream, but a calculated mean force effect for the further steps that are fundamentally required in this reading method (demodulation, filtering, downsampling).

Although only a primary and a secondary mass are always described in the following, it is clear for specialists that of course also more than only one respective mass can be provided. For example, two primary masses that vibrate in opposite directions and respectively also two secondary masses can be provided. The concepts according to the invention can be applied in such arrangements as well.

For a better understanding of the present invention, the latter will be explained in greater detail based on the embodiments shown in the following Figures. Thereby, identical parts are marked with identical reference signs and identical component designations. Furthermore, individual features or combinations of features from the shown or described embodiments can also represent independent or inventive solutions or solutions according to the invention in isolation.

Figure 4:
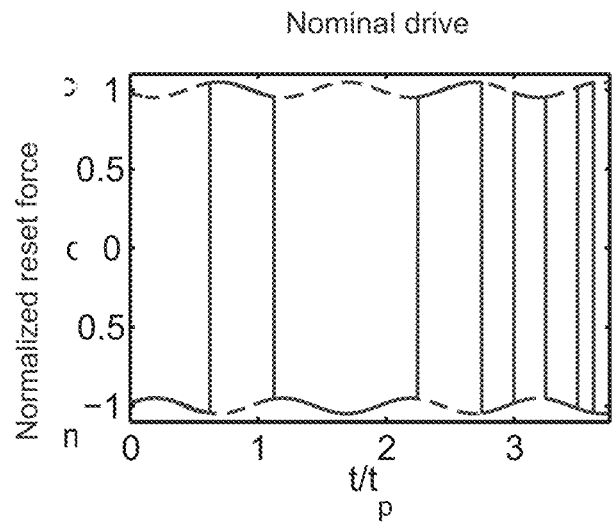
Figure 10:
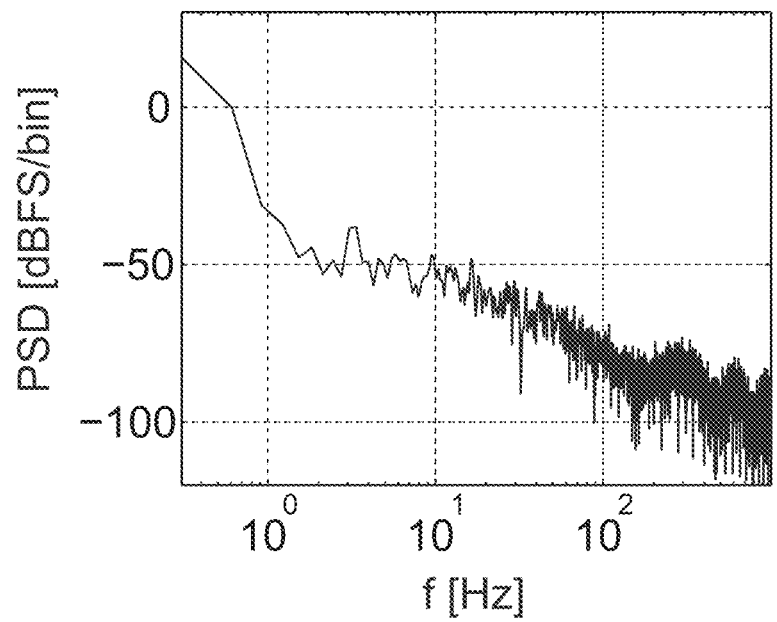
Figure 16:
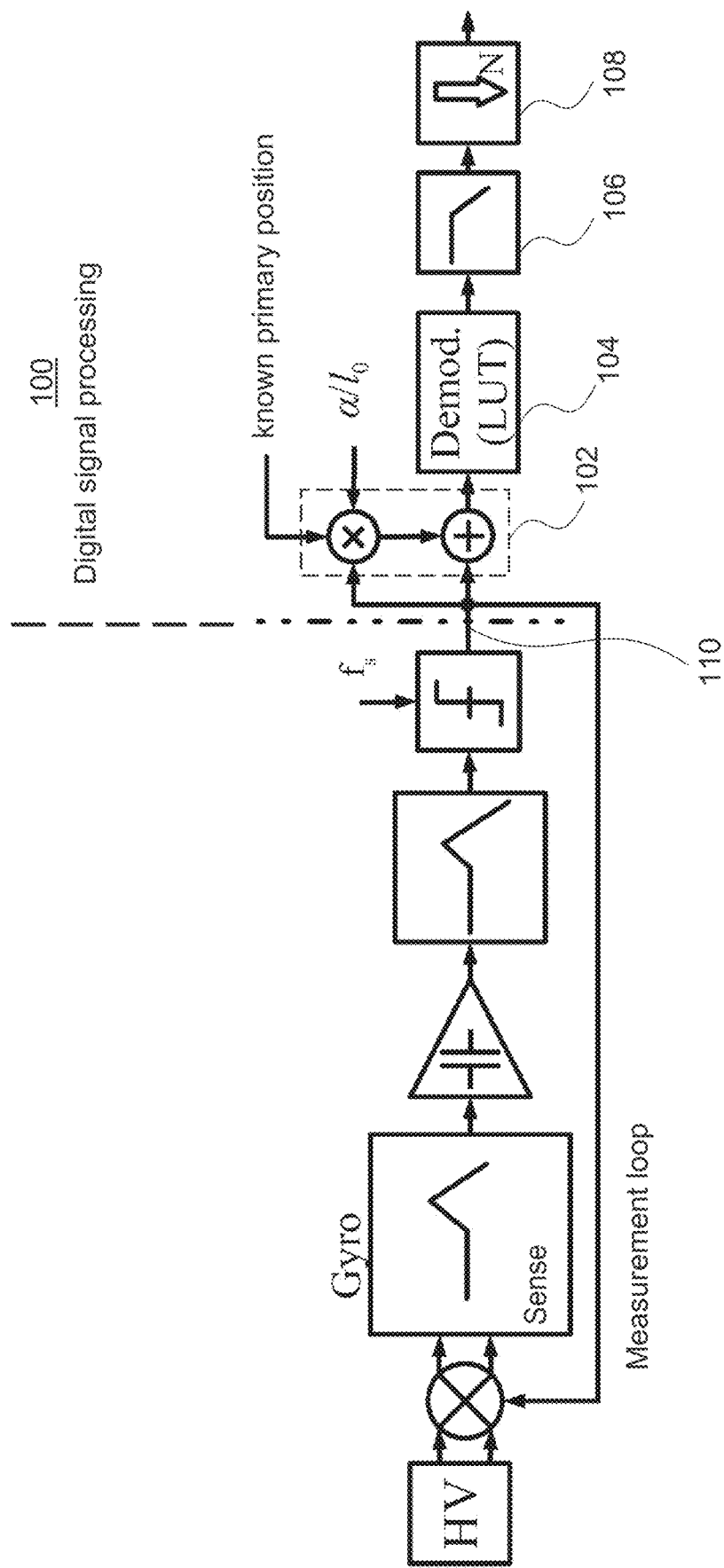
Figure 17:
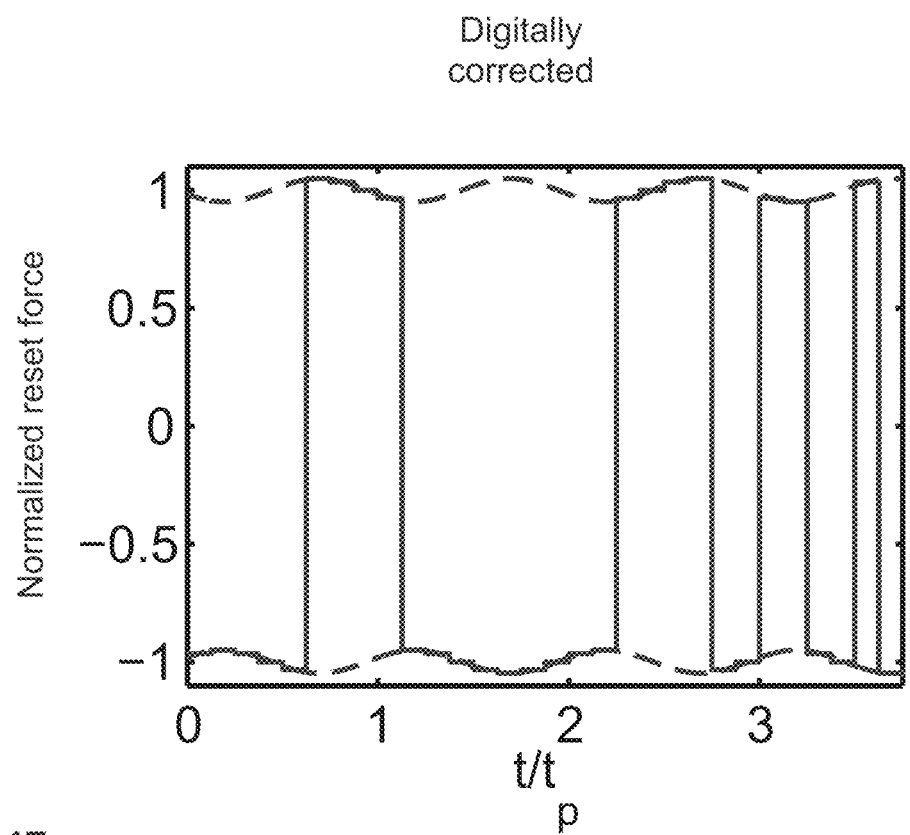
Figure 18:
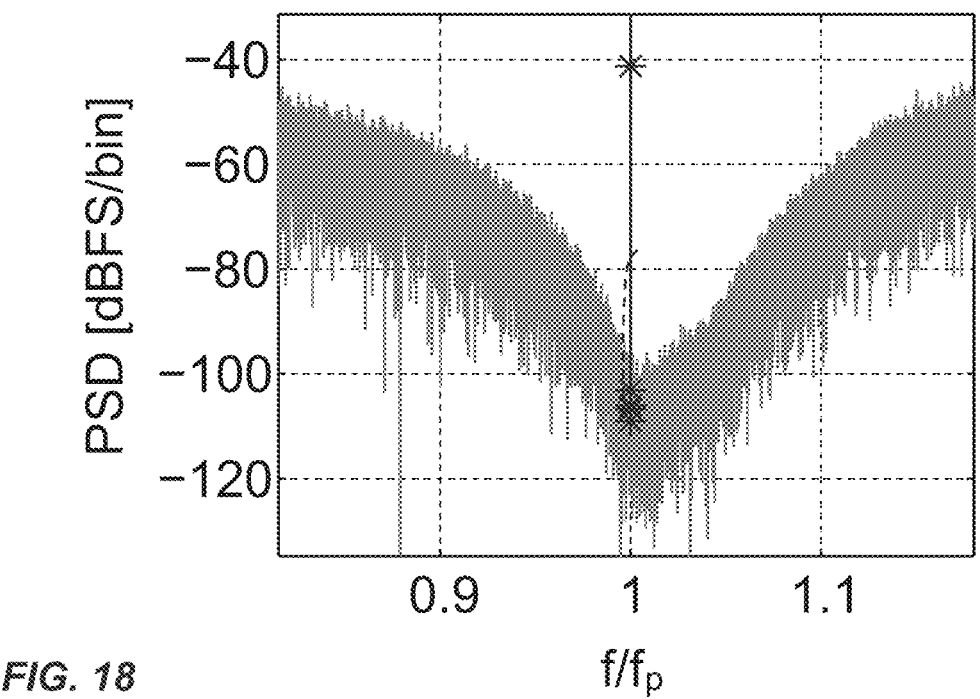
Figure 19:
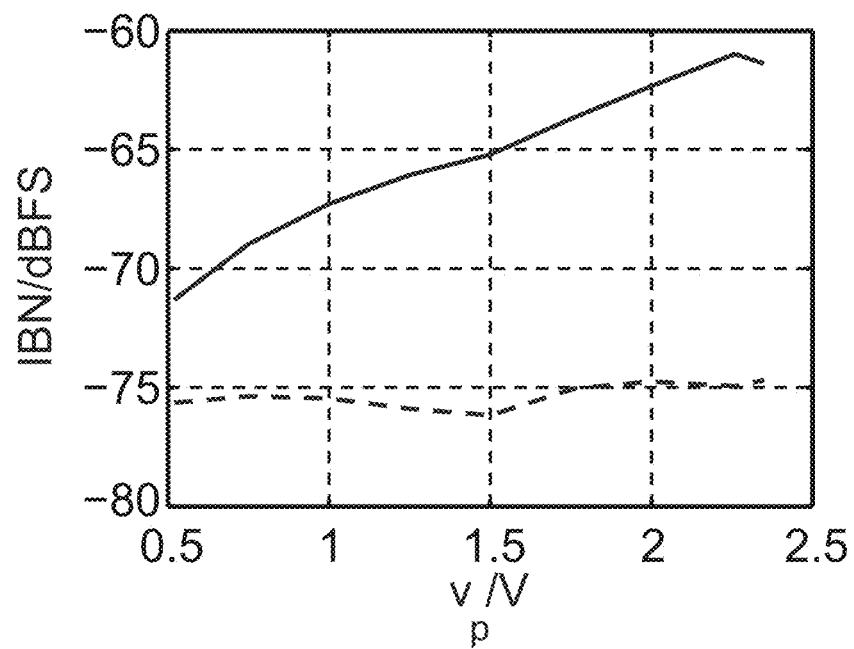
Figure 20:
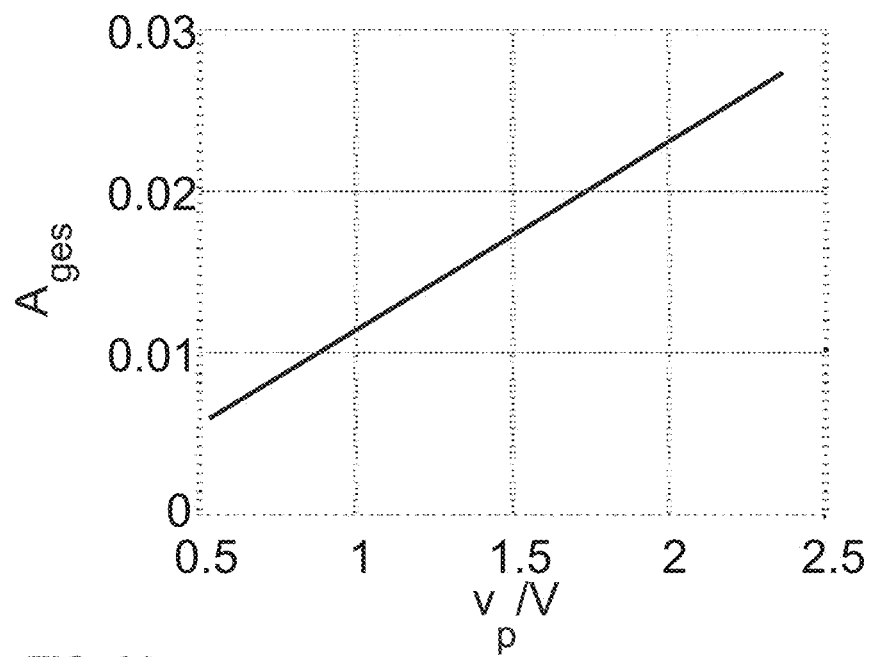
Figure 21:
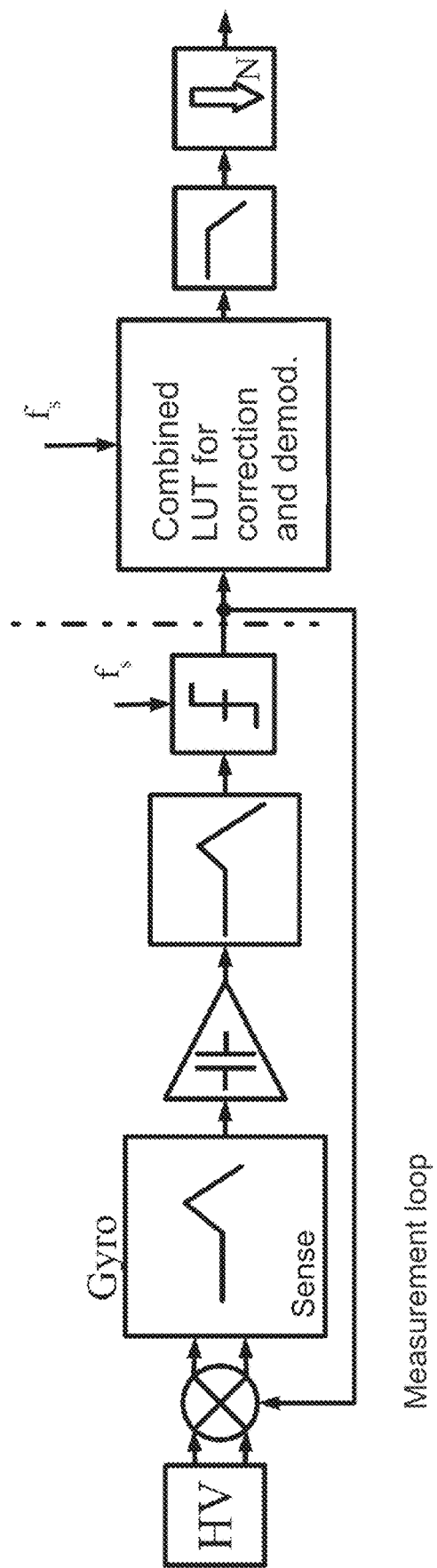
Figure 22:
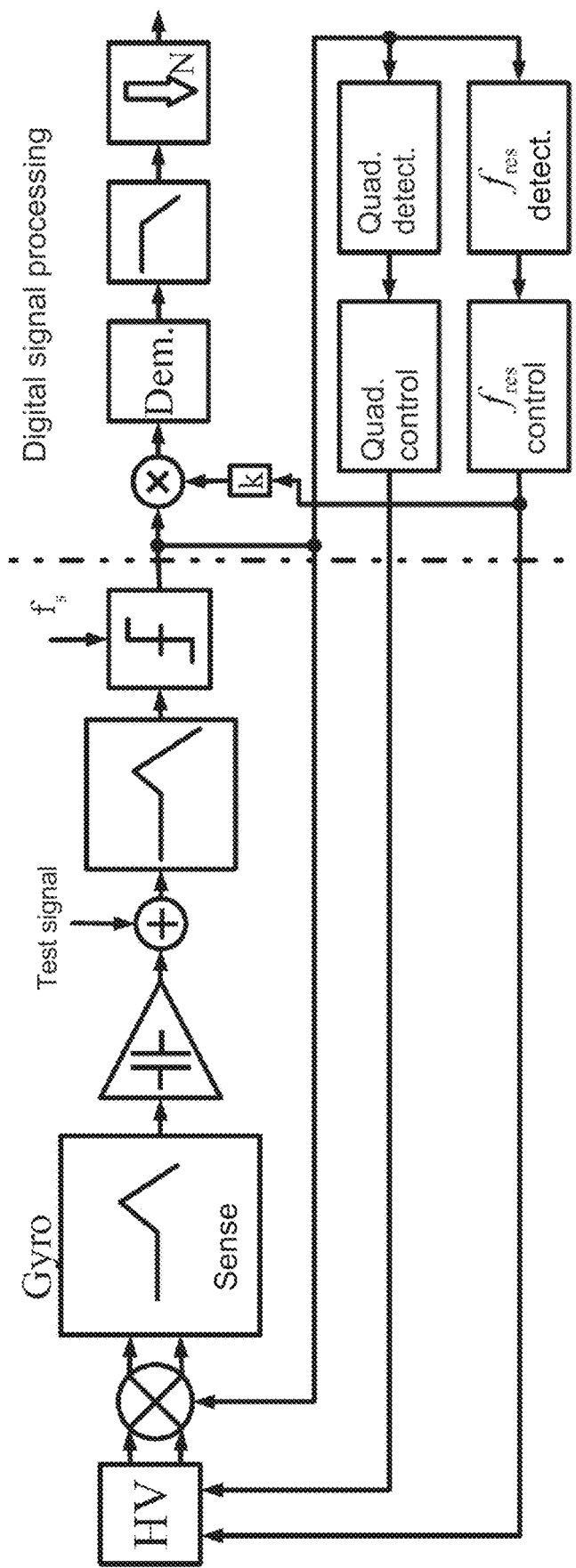
Figure 23:
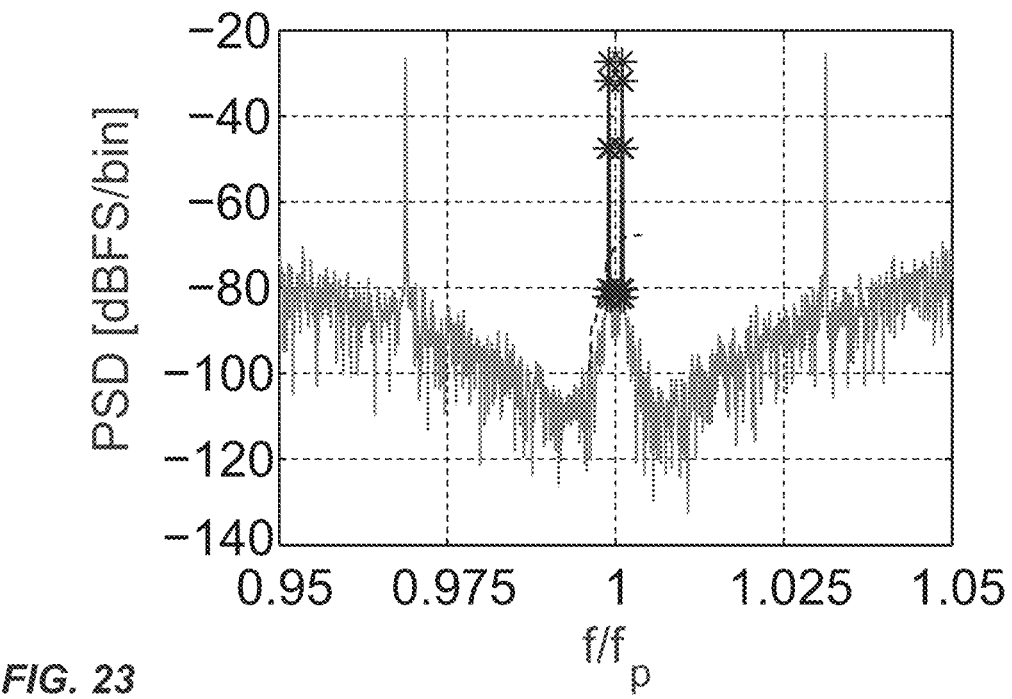
Figure 24:
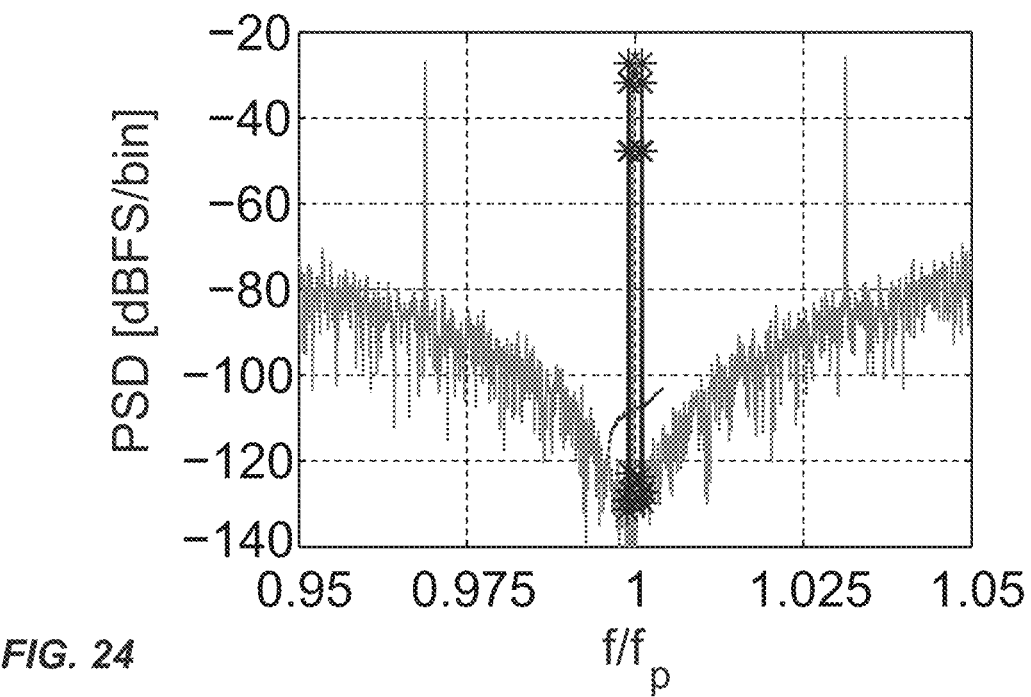
Figure 25:
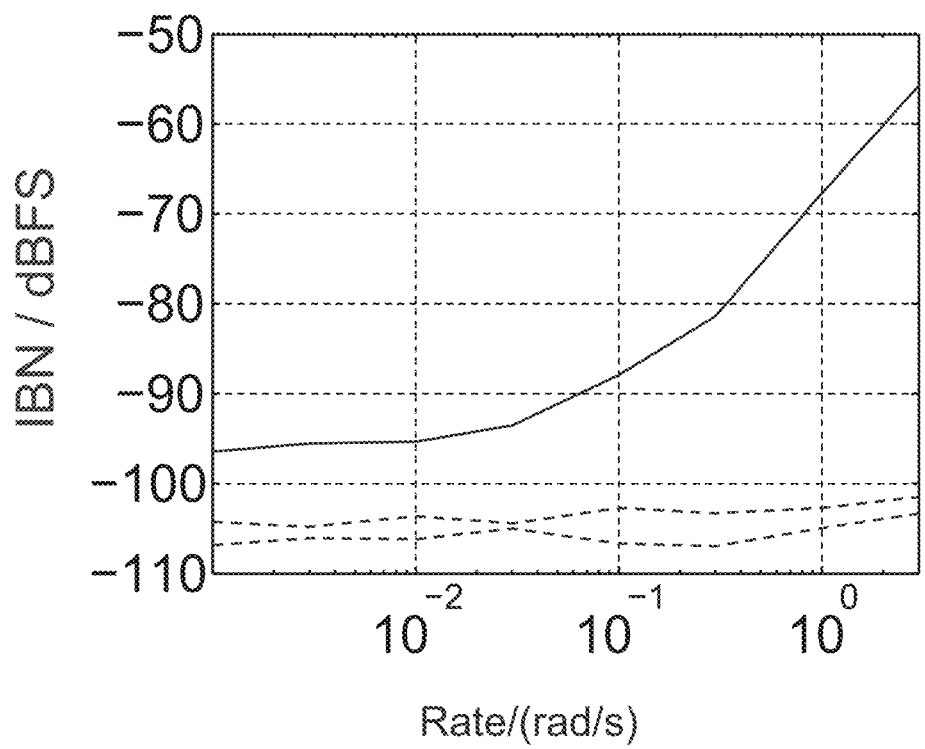
Figure 26:
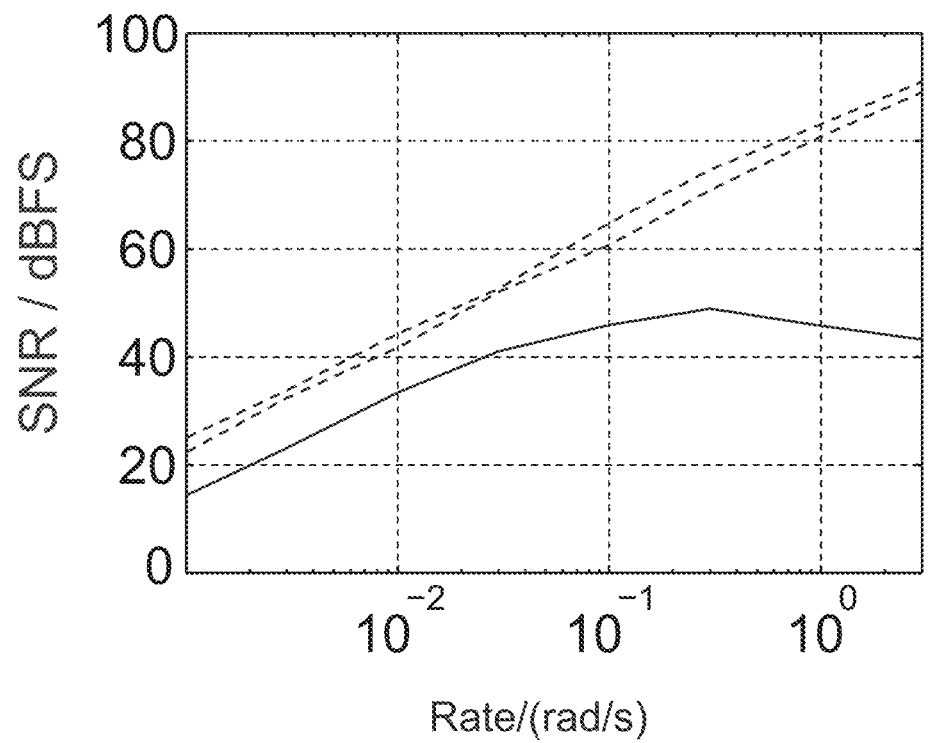

The Figures show:

FIG. 1 a schematic diagram of an electromechanical delta-sigma modulator;

FIG. 2 a schematic display of the arrangement of feedback electrodes on the secondary mass of a capacitive acceleration sensor;

FIG. 3 the temporal progression of the reset force for the arrangement of FIG. 1 in case of a switched-off primary vibration;

FIG. 4 the temporal progression for the reset force for the arrangement of FIG. 1 under the influence of the primary vibration;

FIG. 5 a spectrum of the delta-sigma bit stream of the arrangement from FIG. 1 in case of a switched-off primary vibration;

FIG. 6 a spectrum of the delta-sigma bit stream of the arrangement from FIG. 1 for a nominal primary vibration;

FIG. 7 the noise in the signal band (IBN) as a function of the primary vibration amplitude for the arrangement of FIG. 1;

FIG. 8 a schematic diagram of a known correction circuit;

FIG. 9 a schematic principle display of a further electromechanical delta-sigma modulator with quadrature control and control of the secondary resonance frequency;

FIG. 10 an exemplary spectrum of the control signal for the frequency control in the arrangement from FIG. 9;

FIG. 11 the noise in the signal band (IBN) for the calibrated and the controlled bit stream from the arrangement of FIG. 9 in case of different rotary rates;

FIG. 12 the signal noise ratio (SNR) for the calibrated and the controlled bit stream from the arrangement of FIG. 9 in case of different rotary rates;

FIG. 13 the spectrum of the delta-sigma bit stream of the arrangement from FIG. 9 in case of a switched-off frequency control;

FIG. 14 the spectrum of the delta-sigma bit stream of the arrangement from FIG. 9 in case of a switched-on frequency control;

FIG. 15 the temporal progression of test signals that have been fed in for detection of the secondary resonance frequency in the arrangement of FIG. 9;

FIG. 16 a schematic display of the digital correction according to a first advantageous embodiment of the present invention;

FIG. 17 the temporal progression of the reset force under application of the digital correction according to FIG. 16;

FIG. 18 the spectrum of the digitally corrected bit stream for the arrangement of FIG. 16;

FIG. 19 the noise in the signal band (IBN) for the uncorrected and the corrected bit stream as a function of the primary vibration amplitude;

FIG. 20 the used correction amplitudes as a function of the primary vibration amplitude;

FIG. 21 a schematic display of the digital correction according to a further advantageous embodiment of the present invention;

FIG. 22 a schematic display of the digital correction according to a further advantageous embodiment of the present invention;

FIG. 23 the spectrum of the uncorrected bit stream for the arrangement of FIG. 22 in case of a high rotary rate;

FIG. 24 the spectrum of the corrected bit stream for the arrangement of FIG. 22 in case of a high rotary rate;

FIG. 25 the noise in the signal band (IBN) for the calibrated, the uncorrected and the corrected bit stream as a function of the rotary rate;

FIG. 26 the signal noise ratio (SNR) for the calibrated, the uncorrected and the corrected bit stream as a function of the rotary rate.

With reference to FIG. 16, a first advantageous embodiment of the present invention will be explained in greater detail in the following.

According to the invention, the feedback force that is not temporally constant in terms of its amount due to the primary vibration is digitally reproduced to minimize the effects that are based on the primary vibration. Then, each of the sample values of the bit stream will not be assigned the value 1 and/or −1 but a digital value, which corresponds to the mean force effect for this sample value, for the further steps (demodulation, filtering, downsampling). An exemplary structure for the implementation of such a digital correction is illustrated in FIG. 16.

The arrangement of the electromagnetic delta-sigma modulator (emΔΣM) thereby corresponds to the display from FIG. 1. For the purpose of simplification, only the measurement loop and the digital signal processing 100 are shown in FIG. 16.

According to the present invention, the output bit stream of the emΔΣM is weighted with the current mean force effect. Subsequently, the further digital processing of the corrected bit stream takes place. As shown in FIG. 16, the digital signal processing 100 according to the present invention comprises a digital correction unit 102.

Further processing of the corrected data takes place by means of a lookup table (LUT) for the demodulation 104 as well as a filter arrangement with a low-pass filter 106 and a decimation filter 108.

As the primary vibration is usually controlled both in frequency as well as in amplitude, a known primary vibration and also a known current primary position can be assumed. Alternatively, the primary vibration can be measured on the outputs of the readout circuit (C/V converter) of the primary vibration. This known primary position is used as an input signal for the correction unit 102. Furthermore, a correction factor $all_o$ is calculated based on the capacitive deviation factor a described above and also led into the digital correction unit 102. Therefore, the digital correction unit 102 calculates a corrected bit stream out of the output bit stream 110 of the emΔΣM according to the equation (6) derived above:

$$F_{ges,dr} = F_{ges} \cdot \left(1 + \alpha \cdot \frac{x_p}{l_0}\right) \quad (6)$$

The mean force effect $F_{mean}$ can be determined via the feedback time used by means of integration of the current force effect according to equation (6). For the case that feedback forces are constantly applied, we obtain $t_s = 1 f_s$, whereas $f_s$ designates the sample frequency of the emΔΣM. The following will apply:

$$F_{mean} = \frac{1}{t_s} \int_{t_N}^{t_N + t_s} F_{ges,dr} dt$$

$$= F_{ges} \cdot \left(1 + \frac{\alpha}{l_0 \cdot t_s} \int_{t_N}^{t_N + t_s} x_p dt\right)$$

$$= F_{ges} \cdot \left(1 + \frac{\alpha}{l_0 \cdot t_s} \int_{t_N}^{t_N + t_s} \hat{x}_p \cdot \cos(2\pi f_p \cdot t + \phi) dt\right)$$

In the structure shown in FIG. 16, the intervals for the emΔΣM are generated through a phase-locked control loop (phase locked loop, PLL) in the block "frequency control" of FIG. 1 in a way that $f_s = 8 \cdot f_p$ applies. Furthermore, the frequencies $f_s$ and $f_p$ are in phase so that it can be assumed that $\Phi = 0$.

Hence, the following applies for the weighting values $G_N$ of each sampling value N that are needed for the correction:

$$F_{mean} = F_{ges} \cdot \left(1 + \frac{\alpha}{l_0 \cdot t_s} \int_{t_N}^{t_N+t_s} \hat{x}_p \cdot \cos\left(\frac{2\pi f_s}{8} \cdot t\right) dt\right) \quad (18)$$

$$= F_{ges} \cdot \left(1 + \frac{\alpha \cdot \hat{x}_p}{l_0} \cos\left(\frac{2\pi t_N}{8 t_s} + \frac{\pi}{8}\right)\right)$$

$$F_{mean,N} = F_{ges} \cdot \left(1 + A_{ges} \cdot \cos\left(\frac{2\pi}{8}(N + 0.5)\right)\right)$$

$$G_N = \frac{F_{mean,N}}{F_{ges}} = \left(1 + A_{ges} \cdot \cos\left(\frac{2\pi}{8}(N + 0.5)\right)\right)$$

The weighting values $G_N$ of each sampling value N that are required for the correction can be calculated in advance due to the controlled primary vibration. In addition, only 8 correction values, which subsequently repeat themselves, are needed due to the existing relationship between the primary and the sampling frequency. In the case displayed here, the weighting values for the digital correction are derived in relation to:

$$G_{1:8} = 1 + A_{ges} \cdot 0.924 \cdot [1 \; 0.414 \; -0.414 \; -1 \; -1 \; -0.414 \; 0.414 \; 1] \quad (19)$$

In this context, the weighting value $A_{ges}$ is dependent on the primary amplitude $\hat{x}_p$ and multiplied with an additional constant factor in order to enable a simpler implementation of the LUT.

As a single-bit quantizer is used in the present embodiment, a multiplication step for the performance of the weighting is not required. Only the plus/minus sign of the weighting values is adapted as a function of the output value of the quantizer. FIG. 17 shows a section of the corrected bit stream in an exemplary way together with the actual force effect. FIG. 18 shows the associated spectrum of the corrected bit stream. If this display is compared to the spectrum from FIG. 6, it becomes clear that an improvement of the signal noise ratio by 12 dB can be achieved. This corresponds to an improved resolution by approximately 2 bit.

FIGS. 19 and 20 show the noise in the signal band of the corrected bit stream as well as the required correction amplitudes $A_{gee}$ for the primary amplitudes shown in FIG. 7. A linear relationship between the primary amplitude $v_p$ and the used correction amplitude $A_{ges}$ leads in the present case to the ability to achieve a noise in the signal band that is nearly independent from the primary amplitude. This can be seen in FIG. 19. The solid curve thereby designates the non-corrected bit stream whereas the dashed curve denominates the corrected bit stream.

For further simplification of the digital correction, the LUT of the digital correction and of the demodulation can be combined so that a common LUT with the following values is formed in the present structure for the correction and demodulation:

$$G_{1:8,comb} = [0.414 \; 1 \; 1 \; 0.414 \; -0.414 \; -1 \; -1 \; -0.414] \cdot G_{1:8} \quad (20)$$

Due to the relationship used between the primary frequency and the sampling frequency as well as the controlled primary vibration, these values can also be calculated in advance in ideal cases. The simplified structure with a combined LUT is shown in FIG. 21. The digital correction can hereby be performed with a very low extra digital workload.

To minimize the interference effects during matched-mode-operation, each sampling value of the bit stream is weighed, according to a preferred further development of the present invention, as a function of the voltage $U_{Mode}$ in a way that the reset force that is changed due to the frequency control will be digitally reproduced. For the further steps (demodulation, filtering, downsampling), a sample value of the bit stream is by contrast not assigned the value 1 and/or −1, but a digital value that corresponds to the mean force effect for this sample value.

Ideally, the frequency control in this process is performed in a way that a change of the voltage $U_{Mode}$ can only occur at the sampling times. Therefore, the effects can only change at the sampling times, which facilitates the calculation of the correction values.

FIG. 22 shows the fundamental structure with a digital correction of the bit stream in case of a control of the secondary resonance frequency based on the arrangement shown in FIG. 9. The bit stream is calculated according the present invention with the scaled digital output value of the frequency control for each sample value. Hereby, the scaling k is chosen in a way that the following allocation applies for the value of the bit stream after the correction:

$$\pm 1 \rightarrow \pm \frac{U_{Mode}}{U_{FB}} \quad (21)$$

Through this correction, the reset forces generated according to equation (11) are reproduced, due to which both the described change of the scale factor is corrected and also the noise convolution effects are minimized.

Alternatively, a structure that is similar to the arrangement from FIG. 16 can be used in which only the deviations due to the frequency regulations are calculated and added. The calculation of the deviation can usually be implemented more efficiently as is specified in M. Sarhang-Nejad, G. C. Temes: "A high-resolution multibit ΣΔ ADC with digital correction and relaxed amplifier requirements", IEEE J. Solid-State Circuits, 28(6):648-660, 1993.

As a further alternative, the correction can also take place in the further course of the digital signal processing. The digital signal processing steps that have already taken place prior to the correction have to be taken into account for the correction in order to achieve a correction of the noise convolution effects and of the scale factor. A separate processing of the deviations is possible as well.

FIGS. 23 and 24 show an exemplary display of the spectrum of a non-corrected bit stream and a bit stream corrected in this way in a comparative way. Compared to the spectrum of the uncorrected bit stream, a clear improvement of the IBN can be seen. Compared to the calibrated, uncontrolled system (FIG. 13), it shows that most of the influences on the inband noise have been compensated through the correction.

FIGS. 25 and 26 show the IBN as well as the signal noise ratio for different rotary rates with and without correction compared to the IBN and/or SNR of a calibrated, unregulated system. The solid curves thereby refer respectively to the uncorrected bit stream whereas the dashed curves refer to the calibrated bit stream and the dashed/dotted curves show the IBN and/or SNR of the bit stream corrected according to the invention. It becomes clear that the influences of the effects described with reference to FIG. 9 can be compensated through the digital correction. The correction is hereby independent of the existing rotary rate according to the above relationship (21).

In summary, the levels of the feedback of the sigma-delta modulator are not regarded as temporally constant as usual up to present according to the present invention, but it is assumed that a temporal change of these levels occurs due to further influences. Furthermore, no analogous measures will be taken in order to keep the levels of the feedback forces constant.

The temporally modifiable feedback forces are compensated, in contrast to the state of the art, in a way that a weighting of the respective sample value of the sigma-delta modulator is performed in accordance with the actually impacting feedback forces in the digital post-processing of the bit stream. This leads to an elimination or at least to a minimization of the negative influences of the feedback forces (e.g. increased noise) that are not temporally constant.

This comes with the advantage that no measures have to be taken to keep the reset forces, in particular the value of the reset forces, constant. Therefore, no additional analog circuit components are required especially during generating the voltages to be applied to the sensor.

The negative effect of the non-constant feedback forces is suppressed by digitally reproducing the actually impacting reset forces and by using this digital reproduction in the further signal processing. In addition, also temporal changes that are more complex than the ones observed in this context can be inhibited through a digital weighting and by using respectively adapted weighting values or corresponding calculations.

Due to the digital implementation, this solution offers the possibility of energy and space savings compared to a suppression by means of analog circuits. Another advantage of the digital implementation is theta calibration by means of setting digital parameters is possible very easily. Therefore, this solution can be adapted very easily to other sensors or other technologies, which is only to a limited extent the case for an analog implementation.

In addition, it shall be mentioned that this method takes full advantages of the benefits of the technology scaling in case of an implementation as an application-specific integrated circuit (ASIC) because the displayed solution is structured in a completely. digital way. Due to the digital implementation, a change of the technology used would in addition be possible in an easier way as the layout can be generated automatically for digital parts of the ASIC.

Furthermore, the weighting values that are necessary for compensation of the drive effect can be integrated in the LUT that is required for demodulation of the rotary rate so that only very little additional hardware is needed.

Hence, an improvement of the system is possible with a low and purely digital additional effort, which contributes to an improvement of the system parameters and to the reduction of costs compared to other solutions.

The invention claimed is:

1. A circuit arrangement to read out a capacitive vibratory gyroscope having transversely oriented primary and secondary masses, the circuit arrangement comprising:
   a delta-sigma modulator with at least one control loop having a force feedback which resets the secondary mass to its resting position by outputting a reset signal;
   a correction unit receiving the reset signal and generating a corrected modulator output signal that corresponds to an actually impacting reset force, the correction unit has a multiplying element that is configured to multiply the modulator output signal with a known value of a position of the primary mass and a weighting factor;
   a demodulator connected to the correction unit and demodulating the corrected modulator output signal; and
   a filter arrangement filtering the demodulated signal and outputting a rotary rate signal of the capacitive vibratory gyroscope.

2. The circuit arrangement according to claim 1, wherein the correction unit has an adding part that is configured to add the output of the multiplying element to the reset signal in order to generate the corrected modulator output signal.

3. The circuit arrangement according to claim 1, wherein the demodulator comprises a look-up table.

4. The circuit arrangement according to claim 1, wherein the correction unit and the demodulator are implemented by a combined look-up table.

5. The circuit arrangement according to claim 1, wherein the filter arrangement has a low-pass filter and a decimation filter connected in series.

6. The circuit arrangement according to claim 1, further comprising a controller to control a secondary resonance frequency, wherein the correction unit has a multiplying element that is connected to an output signal of the controller.

7. A Coriolis vibratory gyroscope comprising:
   at least one primary mass and at least one secondary mass that is connected to the primary mass, the primary mass being excited to a primary vibration during operation and the secondary mass being deflected in a direction that is transverse to the primary vibration when the Coriolis vibratory gyroscope rotates around a sensitive axis, and
   a circuit arrangement having: a delta-sigma modulator with at least one control loop with a force feedback which resets the secondary mass to its resting position by outputting a reset signal; a correction unit receiving the reset signal and generating a corrected modulator output signal that corresponds to an actually impacting reset force, the correction unit has a multiplying element that is configured to multiply the modulator output signal with a known value of a position of the primary mass and a weighting factor; a demodulator connected to the correction unit and demodulating the corrected modulator output signal; and a filter arrangement filtering the demodulated signal and outputting a rotary rate signal of the capacitive vibratory gyroscope.

8. A circuit arrangement to read out a capacitive vibratory gyroscope having transversely oriented primary and secondary masses, the circuit arrangement comprising:
   a delta-sigma modulator with at least one control loop having a force feedback which resets the secondary mass to its resting position by outputting a reset signal; and
   a correction unit receiving the reset signal and generating a corrected modulator output signal that corresponds to an actually impacting reset force, the correction unit has a multiplying element that is configured to multiply the modulator output signal with a known value of a position of the primary mass and a weighting factor.

9. The circuit arrangement according to claim 8, further comprising a demodulator connected to the correction unit and demodulating the corrected modulator output signal.

10. The circuit arrangement according to claim 9, further comprising a filter arrangement filtering the demodulated signal and outputting a rotary rate signal of the capacitive vibratory gyroscope.

* * * * *